United States Patent
Frank

(10) Patent No.: US 9,929,413 B2
(45) Date of Patent: Mar. 27, 2018

(54) FUEL CELL SUB-ASSEMBLY AND METHOD OF MAKING IT

(71) Applicant: HYDROGENICS CORPORATION, Mississauga (CA)

(72) Inventor: David Frank, Scarborough (CA)

(73) Assignee: Hydrogenics Corporation, Mississauga (CA)

( * ) Notice: Subject to any disclaimer, the term of this patent is extended or adjusted under 35 U.S.C. 154(b) by 34 days.

(21) Appl. No.: 14/504,167

(22) Filed: Oct. 1, 2014

(65) Prior Publication Data

US 2015/0093671 A1   Apr. 2, 2015

Related U.S. Application Data

(60) Provisional application No. 61/885,652, filed on Oct. 2, 2013.

(51) Int. Cl.

| H01M 8/02 | (2016.01) |
|---|---|
| H01M 8/04 | (2016.01) |
| H01M 8/0258 | (2016.01) |
| H01M 8/0286 | (2016.01) |
| H01M 8/0276 | (2016.01) |
| H01M 8/241 | (2016.01) |
| H01M 8/0273 | (2016.01) |
| H01M 8/2483 | (2016.01) |
| H01M 8/1004 | (2016.01) |
| H01M 8/0267 | (2016.01) |
| H01M 8/0297 | (2016.01) |

(52) U.S. Cl.
CPC ....... *H01M 8/0258* (2013.01); *H01M 8/0267* (2013.01); *H01M 8/0273* (2013.01); *H01M 8/0276* (2013.01); *H01M 8/0286* (2013.01); *H01M 8/0297* (2013.01); *H01M 8/1004* (2013.01); *H01M 8/241* (2013.01); *H01M 8/2483* (2016.02); *Y02P 70/56* (2015.11)

(58) Field of Classification Search
CPC ............. H01M 8/0258; H01M 8/0286; H01M 8/0276; H01M 8/0267; H01M 8/1004; H01M 8/0297
See application file for complete search history.

(56) References Cited

U.S. PATENT DOCUMENTS

| 6,139,675 | A | 10/2000 | Druecke et al. |
| 6,599,653 | B1 * | 7/2003 | Cummins ........... H01M 8/0273 |
| | | | 29/623.1 |
| 6,852,439 | B2 | 2/2005 | Frank et al. |
| 7,210,220 | B2 | 5/2007 | Frank et al. |
| 7,226,684 | B2 | 6/2007 | Flaesterer |
| 7,432,007 | B2 | 7/2008 | Cummins et al. |
| 7,655,339 | B1 | 2/2010 | Kummerow et al. |
| 8,197,989 | B2 | 6/2012 | Jacobine |
| 2003/0235744 | A1 * | 12/2003 | Pflaesterer .......... H01M 8/0271 |
| | | | 429/463 |
| 2005/0026025 | A1 | 2/2005 | Shah et al. |
| 2005/0100771 | A1 * | 5/2005 | Vyas ................... H01M 8/0206 |
| | | | 429/437 |
| 2006/0093882 | A1 | 5/2006 | Muller |
| 2006/0131819 | A1 | 6/2006 | Kurano et al. |
| 2007/0210475 | A1 | 9/2007 | Pflaesterer |
| 2015/0072266 | A1 * | 3/2015 | Hood ................... H01M 8/0247 |
| | | | 429/485 |

FOREIGN PATENT DOCUMENTS

| DE | 102005062643 A1 | 7/2007 |
| EP | 1693915 A1 | 8/2006 |

OTHER PUBLICATIONS

Freudenberg Carl KG, DE102005062643, English Translation of Abstract dated Jul. 5, 2007.
European Patent Application No. 14850561, Supplementary European Search Report dated Feb. 20, 2017, 8 pages.
International Patent Application No. PCT/CA2014/050947, International Preliminary Report on Patentability dated Apr. 14, 2016.
International Patent Application No. PCT/CA2014/050947, International Search Report and Written Opinion dated Jan. 12, 2015.

* cited by examiner

Primary Examiner — Muhammad S Siddiquee

(57) ABSTRACT

A sub-assembly for an electrochemical stack, such as a PEM fuel cell stack, has a bipolar plate with sealing material extending from its upper face, around the edge of the bipolar plate, and onto its lower face. The bipolar plate is preferably a combination of an anode plate and a cathode plate defining an internal coolant flow field and bonded together by sealing material which also provides a seal around the coolant flow field. All of the sealing material in the sub-assembly may be one contiguous mass. To make the sub-assembly, anode and cathode plates are loaded into a mold. Liquid sealing material is injected into the mold and fills a gap between the edge of the plates, and portions of the outer faces of the plates, and the mold. In a stack, sub-assemblies are separated by MEAs which at least partially overlap the sealing material on their faces.

12 Claims, 3 Drawing Sheets

FUEL CELL SUB-ASSEMBLY AND METHOD OF MAKING IT

CROSS-REFERENCES TO RELATED APPLICATIONS

This application claims the benefit of U.S. provisional patent application No. 61/885,652 filed on Oct. 2, 2013 which is incorporated herein by reference.

FIELD

This specification relates to electrochemical cells, such as fuel cells, and in particular to a sub-assembly of plates and seals for use in making in a cell stack, and to methods of making the sub-assembly.

BACKGROUND

A proton exchange membrane (PEM) fuel cell (PEMFC), alternatively called a polymer electrolyte membrane fuel cell, typically comprises an anode plate and a cathode plate separated by a membrane electrode assembly (MEA), typically with a gas diffusion layer (GDL) between each side of the MEA and its adjacent plate. The surfaces of the anode plate and cathode plate that face the MEA are shaped to provide a flow field for the reactant gasses, typically hydrogen and air. A PEM fuel cell stack comprises an assembly of fuel cells clamped between and end plates, end plate insulator and current collector at each end of the stack. In the stack, the anode plate and cathode plate of adjacent fuel cells are electrically connected and may be provided by a bipolar. The bipolar plate may be a unitary structure or an anode plate and cathode plate bonded together. Coolant flow fields may be provided between adjacent fuel cells, either between every pair of successive fuel cells or at some lesser interval, for example after every second to fifth fuel cell. The coolant flow fields may be provided within a bipolar plate, between abutting anode and cathode plates, or in a separate plate. Typically, there are also various holes through the thickness of the plates. These holes collectively define conduits through the stack (perpendicular to the plates) to transport reactants, reaction products, or coolant to or from the individual fuel cells. Seals are required between each flow field and the adjacent MEA. Seals are also required around the holes in the plates, and between the holes and their associated flow fields. Seals may also be required around coolant flow fields. Optionally, seals may also electrically insulate the anode plate and cathode plate of a fuel cell, or between adjacent bipolar plates. Due to the large number of seals and plates in a fuel cell stack, methods of making and assembling these components are constantly in need of alternatives to provide improvements or to be suited to selected manufacturing techniques and materials.

In U.S. Pat. No. 6,599,653, anode and cathode plates are molded from plastic composites that include graphite. The anode and cathode plates are made into a sub-assembly called a fuel cell unit. Each fuel cell unit also includes an insulation layer on the bottom of the anode plate, a bead of sealant between the anode plate and the cathode plate, and another bead of sealant on the top of the cathode plate.

The anode and cathode plate have aligned gates to facilitate the flow of a curable liquid silicone through the plates and grooves to receive the beads of sealant. A fuel cell unit is made by placing an anode plate and cathode plate on the floor of a mold with the anode plate spaced from the floor of the mold. Liquid silicone is then forced through the gates and into the space between the anode plate and the floor of the mold. When the silicone cures, the insulation layer and the two beads of sealant are formed as a unitary, contiguous mass. This mass bonds the anode plate and cathode plate together and provides an insulation layer and seal on opposed sides of the bonded plates.

U.S. Pat. No. 7,210,220 describes a sealing technique for fuel cells and other electrochemical cells. To provide a seal, a groove network is provided through various elements of a fuel cell assembly. One fuel cell assembly includes anode and cathode plates, MEAs and GDLs for several fuel cells, all clamped together between end plates, end plate insulators and current collectors. Insulating material is provided between the anode and cathode plates of each fuel cell to prevent shorts across the fuel cells. The insulation may be provided as part of an adjacent MEA (for example as a non-conductive flange bonded to the MEA), by a GDL which extends to the edge of the plate, or by using plates that are made non-conductive or covered with an insulator in these areas. A source of seal material is then connected to an external filling port and injected into the groove network. When the sealing material cures, it forms a "seal in place" that bonds and seals the fuel cell assembly elements. In an alternative embodiment, a Membrane Electrode Unit (MEU) is made which comprises 1 to 5 sealed in place fuel cells. At least one of the outer faces of the MEU has an outer seal. This outer seal is adapted to seal to another MEU. Typically, an outer face of the MEU is adapted to form a cooling chamber with the other MEU. A fuel cell stack is produced by assembling any number of MEUs with end plates, end plate insulators and current collectors.

SUMMARY OF THE INVENTION

The following summary is intended to introduce the reader to the detailed description to follow and not to limit or define any claimed invention.

A sub-assembly for an electrochemical stack described in this specification has a bipolar plate with flow fields on its upper and lower faces, and a sealing material bonded to the bipolar plate. The sealing material extends from the upper face of the bipolar plate, around the edge of the bipolar plate, and onto the lower face of the plate. Preferably, the sealing material also forms a bead around the periphery of one or both of the flow fields. Preferably, the sealing material also forms beads around one or more holes for reactant, combustion product, or coolant flow through the bipolar plate.

The bipolar plate may be a unitary structure or, preferably, a combination of an anode plate and a cathode plate bonded together and having an internal coolant flow field. In this case, the anode plate and the cathode plate may be bonded together by sealing material which also provides a seal around the coolant flow field. One or both of the plates preferably has one or more gates through its thickness, or extending inwards from its edge, to allow liquid sealing material to be injected between the plates. Optionally, all of the sealing material in the sub-assembly may be one contiguous mass.

In a method of making a sub-assembly described in this specification, a single anode plate and a single cathode plate are loaded into a mold in a liquid injection molding machine such that reactant flow fields on the plates face away from each other. A liquid sealing material, for example liquid silicone rubber, is injected into the mold and fills a gap between the edge of the plates, and portions of the outer faces of the plates, and the mold. The liquid sealing material may also flow through various grooves or gates, or both, of the plates. Preferably, sealing material extending around the edges of the plates, sealing material bonding the anode and cathode plates together, and sealing material sealing around a coolant flow field between the plates, are all applied while the plates are in a single mold. Preferably, all of the sealing material applied to the plates merges into a single mass.

An electrochemical cell stack, for example a PEM fuel cell stack, described in this specification has a plurality of sub-assemblies as described above, or sub-assemblies made by the method described above. Within the stack, a GDL is located on the upper face of a lower sub-assembly, preferably within the sealing material on the upper face of the lower sub-assembly. An MEA is located over the GDL and at least partially overlaps with the sealing material on the upper face of the lower sub-assembly. A second GDL is located over the MEA, preferably within the sealing material on the lower face of an upper sub-assembly.

DETAILED DESCRIPTION

Figure 1:
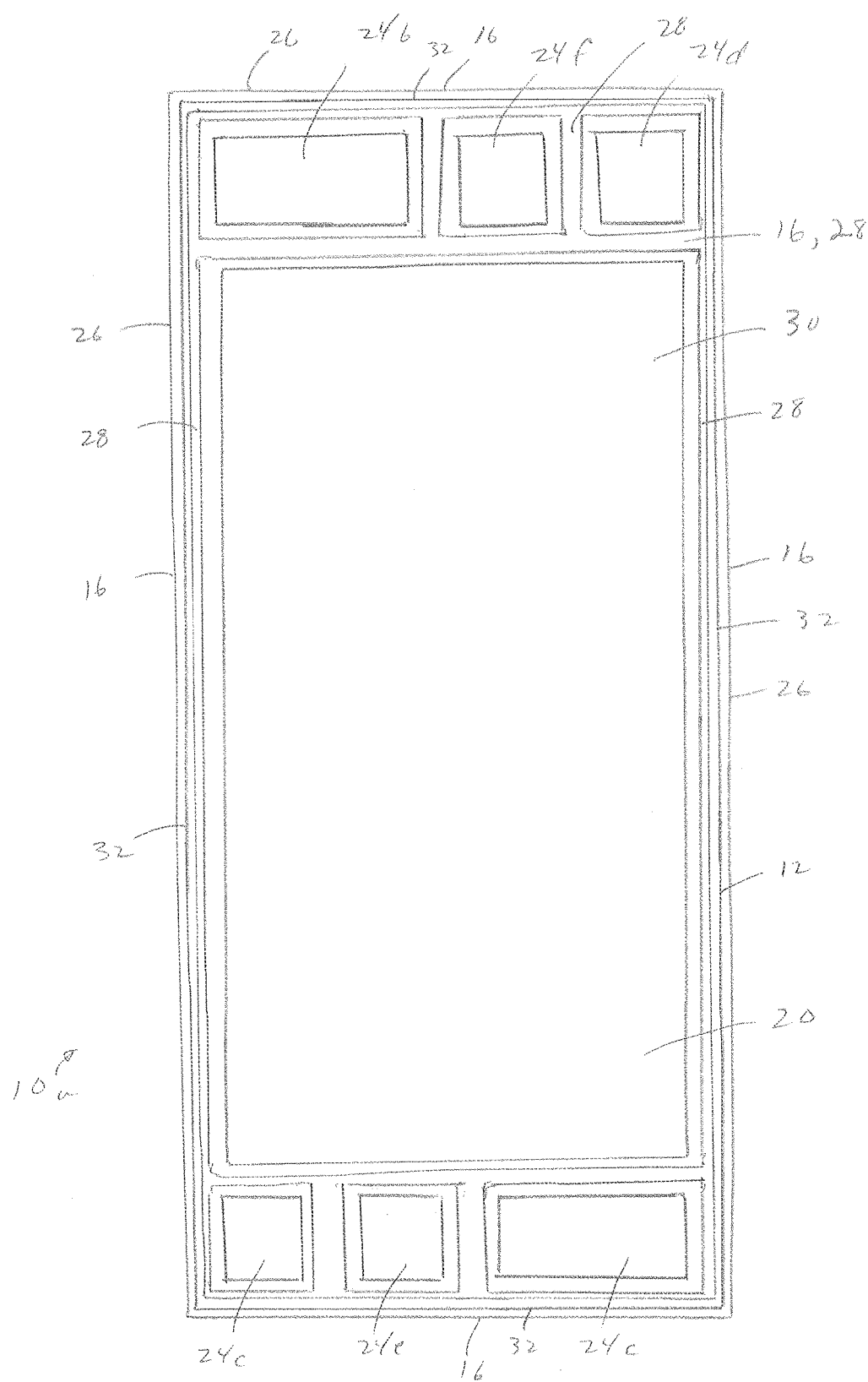
FIG. 1 is a schematic plan view of a face of a sub-assembly.
Figure 2:
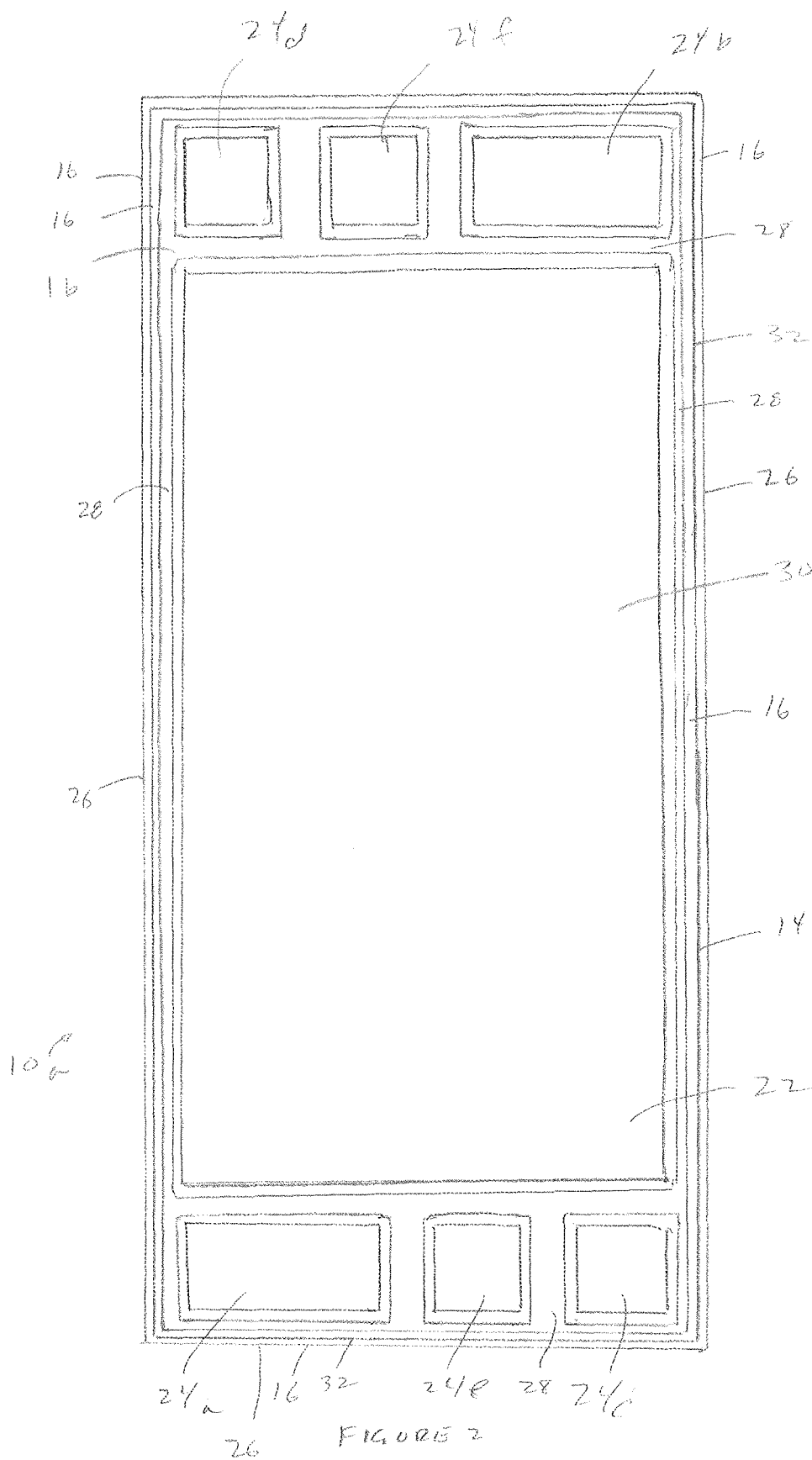
FIG. 2 is a schematic plan view of another face of the sub-assembly of FIG. 1.

FIGS. 1 and 2 show a sub-assembly 10 for an electrochemical cell, for example a PEM fuel cell. The sub-assembly 10 has an anode plate 12 and a cathode plate 14 located back to back. The anode plate 12 is visible in FIG. 1 and the cathode plate is visible in FIG. 2. The plates 12, 14 have faces 30, which are visible in FIGS. 1 and 2, and edges 32, which are shown as lines bordering the faces 30 in FIGS. 1 and 2. Either of the outer faces 30, visible in FIGS. 1 and 2, may be called an upper or a lower face 30 depending on the orientation of the sub-assembly 10. Inner faces 30 of the plates 12, 14 contact each other and are not visible in FIGS. 1 and 2 but appear as lines in the other Figures. The plates 12, 14 are made of a conductive material. For example, the plates 12, 14 may be made of a metal such as stainless steel or, preferably, a molded composite of a plastic or other resin mixed with graphite.

The sub-assembly 10 also has one or more masses of cured sealing material 16. The sealing material 16 may be made by curing any suitable curable liquid such as liquid silicone rubber (LSR), a polysiloxane elastomeric material as described in U.S. Pat. No. 7,210,220, an ethylene acrylic polymer, an ethylene propylene terpolymer, an epoxy resin or a thermoplastic elastomer. The sub-assembly 10 does not include a gas diffusion layer (GDL) or membrane electrode assembly (MEA) and instead consists essentially of the plates 12, 14 and cured sealing material 16. Preferably, the sub-assembly 10 consists only of the plates 12, 14 and sealing material 16.

Preferably, the plates 12, 14 are not bonded together other than by the sealing material 16. Optionally, the plates 12, 14 may be separately bonded together, for example by an epoxy resin mixed with graphite and applied to the inside face of one or both of the plates 12, 14. However, this requires an extra step, and additional manufacturing equipment and space, all of which can be avoided by using the sealing material 16 to bond the plates 12, 14.

One or both of the plates 12, 14, for example the anode plate 12, preferably defines a coolant flow field 18 between the plates 12, 14. The outer face of the anode plate 12 also defines an anode flow field 20 and the outer face of the cathode plate 14 defines a cathode flow field 22. The flow fields 18, 20, 22 are typically more complex than what is shown in FIGS. 1 and 2.

Aligned openings 24 through the plates 12, 14 define parts of conduits. The openings 24 may be collected at the ends of the plates 12, 14 as shown, or provided in different locations. In the sub-assembly 10 shown, one opening 24a is provided to supply a reactant, typically air, to the cathode flow field 22 and then to a second opening 24b provided to remove excess air, or nitrogen, and water. A third opening 24c is provided to input another reactant, for example hydrogen, to the anode flow field 20 and then to a fourth opening 24d to remove excess hydrogen. A fifth opening 24e is provided to supply a coolant, for example water or water mixed with an anti-freezing agent, to the coolant flow field 18 and then out through a sixth opening 24f. Optionally, more or less openings 24 may be used. For example, in an air cooled cell stack, the coolant flow field 18 is open at two opposed sides of the plates 12, 14 and openings 24 for coolant flow are not required.

The plates 12, 14 provide a bipolar plate with an internal coolant flow field 18. To create a PEM fuel cell stack, two or more sub-assemblies 10 are stacked together. A gas diffusion layer (GDL), a membrane electrode assembly (MEA) and a second GDL are placed between successive sub-assemblies 10. The gas diffusion layers extend generally across the anode flow field 20 and cathode flow field 22, but preferably end within sealing material 16 on the faces 30 of the plates 12, 14. The MEA extends across the anode flow field 20 and the cathode flow field 22, and at least overlaps with sealing material 16 on the faces 30 of the plates 12, 14. Optionally, the MEA may also extend from the reactant flow fields 20, 22 and overlap with sealing material surrounding one or more openings 24 that define reactant conduits. In this way, the reactants are sealed on opposite sides of the MEA. Passages 34 in the plates 12, 14 between the openings 24 and the flow fields 18, 20, 22 are shown in a simplified form in FIGS. 1 and 2 but can also be provided in other configurations known in the art. For example, whereas FIGS. 1 and 2 show a "back side feed" configuration in which passages 34 for reactants are provided on inner faces 30 of the plates, the passages 34 may alternatively be located in the outer faces 30 of the plates 12, 14.

Sealing material 16 is applied to the plates 12, 14 in a liquid form and then cured on, and preferably between, the plates 12, 14. The plates 12, 14 are placed in a mold having recesses to define outer surfaces of the sealing material 16 on the outer faces 30 and edges 32 of the plates 12, 14. This mold is placed in a liquid injection molding (LIM) press or other suitable molding machine. The liquid sealing material, preferably liquid silicone rubber, is then injected into the mold and cured. Vents are provided in the mold or the plates 12, 14 to allow air to escape as the sealing material 16 is injected into the mold. The size, number and location of mold injection points and vents can be determined by methods known in the art of injection molding. Injected liquid sealing material 16 flows quickly around the periphery of the plates in the injection mold which advantageously reduces the number of injection points to the mold that are required and can also reduce, or optionally eliminate, the need for injection molding gates through the thickness of the plates 12, 14.

When using composite molded plates 12, 14, some water (or another coolant fluid) may diffuse from the coolant flow field 18 through the plates 12, 14 themselves. Water (or vapor) that diffuses into the reactant flow fields 20, 22 is carried away with the flows of the reactants or reaction products and typically causes no harm. However, some water can also appear at the edges of the plates 12, 14. This water can cause problems, such as shorting between adjacent fuel cells or interference with balance of plant elements around a stack. For this reason, the sealing material 16 preferably includes an edge sealing portion 26 that wraps around the edges 32 of the plates 12, 14. The edge sealing portion 26 also electrically isolates the edges 32 of the plates 12, 14, which is useful even with metal plates 12, 14. The edge sealing portion 26 is preferably contiguous around the entire periphery of the plates 12, 14. The MEAs preferably do not extend to the edges 32 of the plates. In this way, the side of a complete stack is practically insulated in that a solid conductor touching the outside of a stack is unlikely to cause a short.

The sealing material 16 preferably provides various bead portions 28. The bead portions 28 seal the reactants on either side of the MEA and may also help seal between the openings 24 of adjacent sub-assemblies 10 in a stack. The shape of the bead portions 28 is selected to produce a sufficient pressure against the MEA when a stack is clamped together. Preferably, the bead portions are located over grooves 42 in the plates 12, 14. The bead portions 28 may be provided on one or both sides of the plates 12, 14 around the peripheries of the reactant flow fields 20, 22. Preferably, the edge sealing portion 26 of the sealing material 16 extends from a bead portion 28 on one outer face 30 of the sub-assembly 10 to the bead portion 28 on the other outer face 30 of the sub-assembly 10 to form one continuous mass of sealing material. The bead portions 28 are made thicker than adjacent parts of the edge sealing portion 26 on the outer face of a plate 12, 14. This is avoids needlessly increasing the total force that would be required to provide sufficient compression in the bead portions 28. It also helps allow the deformation of the sealing material 16 to be consistent as between bead portions 28 located near the edges 32 of the plates 12, 14 and bead portions 28 displaced from the edges 32 by openings 24. Optionally, additional bead portions 28 may be located near at or the edges 32 of the plates 12, 14, beyond the area that will be overlapped by the MEA, to better insulate the edges of the MEA from the sides of a stack.

Figure 3:
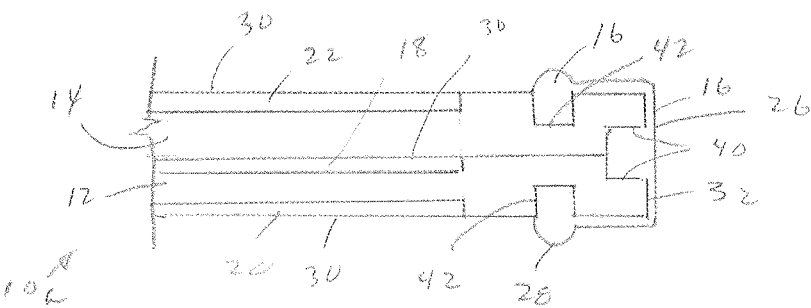
FIGS. 3 and 6 are schematic cross sections of portions of the sub-assembly of FIGS. 1 and 2.

FIG. 3 shows a portion of an alternative sub-assembly 10a in cross section. In this portion of the sub-assembly 10a there is no opening 24 and a coolant flow field 18 extends to near the edge 32 of the plates 12, 14. The thickness of the plates 12, 14 is exaggerated in FIG. 3 (and in FIGS. 4 to 6) and each may be on the order of 1 mm.

Although it is possible for the edges 32 of the plates 12, 14 to form a single plane as in FIGS. 1 and 2, the resulting edge sealing portion 26 alone might not provide an adequate seal around an internal coolant field 18. In FIG. 3, the edges 32 of the plates 12, 14 have a step 40 to provide additional sealing material 16 near the inner faces 30 of the plates 12, 14. Preferably, the step 40 is provided around the entire periphery of the plates 12, 14. Optionally, the step 40 could be provided in only the anode plate 12 or only the cathode plate 14. Alternatively, the step 40 may have another profile rather than the generally rectangular notch shown.

Figure 4:
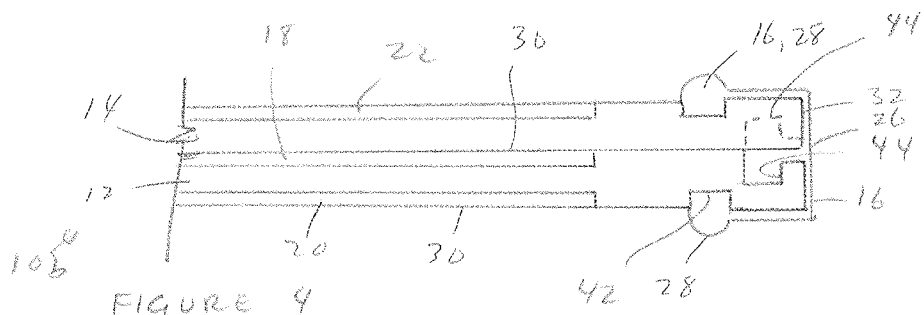
FIGS. 4 and 5 are schematic cross sections of portions of alternative sub-assemblies.

FIG. 4 shows a portion of another alternative sub-assembly 10b in cross section. In this case, a key 44 is provided in the anode plate 12. Optionally, the key 44 could be provided in the cathode plate 14 or keys 44 could be provided in both plates 12, 14. The key 44 again provides additional sealing material near the inner faces of the plates 12, 14. In addition, the key 44 mechanically locks the edge sealing portion 26 of the sealing material 16 to the edges 32 of the plates. For this purpose, the key 44 is preferably provided around the entire periphery of the plates 12, 14. The key 44 may have a profile other than the profile shown.

Figure 5:
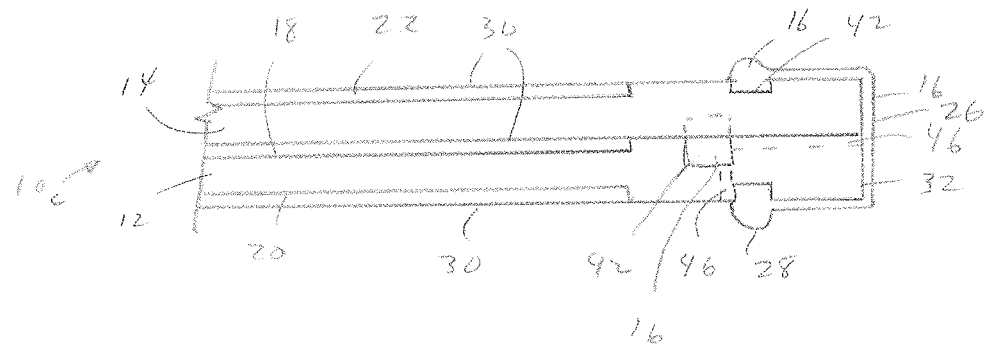

FIG. 5 shows a portion of another alternative sub-assembly 10c in cross section. In this case, a groove 42 is located on the inner face 30 of the anode plate 12. Optionally, a groove 42 may be located on the inner face 30 of the cathode plate 12, or on the inner faces 30 of both plates 12, 14. This groove 42 may be located directly below, or overlapping with, a groove 42 on an outer face 30 of the same plate 12, 14. However, it is preferable for a groove 42 on an inner face 30 of a plate 12, 14 to be located either inside (away from the edge 32) or outside (towards the edge 32) of a groove 42 on an outer face 30 of the same plate 12, 14 to avoid having a very thin section in the plate 12, 14. Liquid sealing material 16 may be fed to a groove 42 on an inner face 30 of a plate 12, 14 through one or more gates 46. The gates 46 may, for example, pass through the thickness of a plate 12, 14. Alternatively, or additionally, gates 46 may be provided in the form of channels molded into the inner face 30 of a plate 12, 14 and contiguous with the edge 32 of the plate 12, 14.

Figure 6:
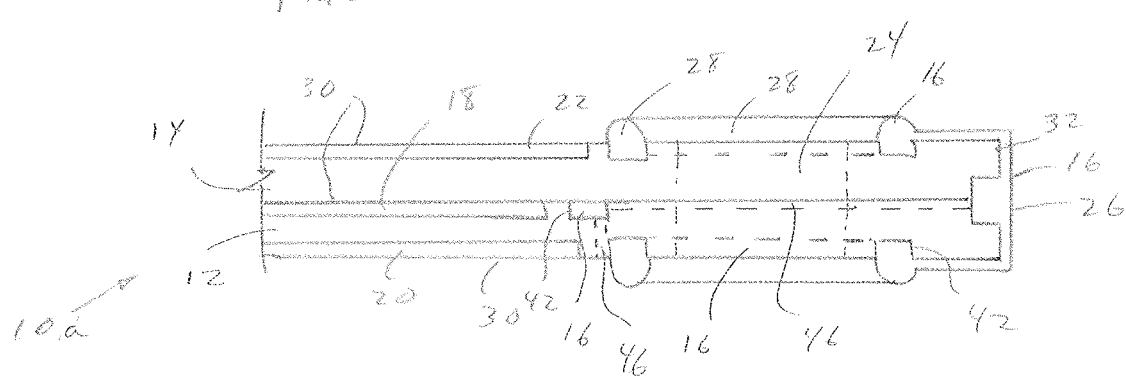

FIG. 6 shows another portion of the alternative sub-assembly 10a of FIG. 3 in cross section. In this portion of the sub-assembly 10a there is an opening 24 between the coolant flow field 18 and the edges 32 of the plates 12, 14. The sealing material 16 surrounds the opening 24 on the outer faces 30 of the plates 12, 14, preferably by way of beaded sections 28 located over grooves 42. The sealing material 16 also surrounds the opening 24 in the inside face 30 of one, or optionally both, plates 12, 14. The internal sealing material 16 required to surround the opening 24 flows inwards from the edge 32 of a plate 12, 14 through grooves 42 or gates 46 formed in the inside face 30 of the plate 12, 14.

Alternatively or additionally, sealing material 16 required to surround the opening 24 may also be provided through one or more gates 46 through the thickness of a plate 12, 14. Sealing material 16 may be provided around an opening 24 in the sub-assemblies 10 of the FIG. 1, 2, 4 or 5 in a similar manner.

In further alternative structures, a coolant flow field may be provided in a separate plate rather than as part of the cathode plate 14 or anode plate 12. The coolant field plate may be connected to an opening 24 in the plate or to an external coolant jacket or to the atmosphere. In this case, some of the sub-assemblies 10 in a stack may be made as described above but without a coolant field 18 by omitting the coolant field plate. In sub-assemblies 10 with a coolant field 18, the coolant field plate is placed between the cathode plate 14 and anode plate 12 in a mold and sealing material 16 is injected around the edges 32 of all three plates as described above. The coolant field plate can be sealed to either, or both, of the cathode plate 14 and anode plate 12 by the edge sealing portion 26 alone or as shown for seals between the cathode plate 14 and anode plate 12 in any of FIGS. 3 to 6.

The sealing material 16 both seals to the MEA when compressed in a stack and separate adjacent sub-assemblies 10 in a stack. Although many individual sub-assemblies must be made, the bead portions 28 assist in locating the GDLs and MEAs while forming a stack. The various methods described in U.S. Pat. No. 7,210,220 to avoid shorting the fuel cells when using a seal in place are not required. The stack may be disassembled and the MEAs examined if the stack is defective. Yet, the edges of the plates 12, 14 are sealed against coolant leakage without requiring additional steps. In this way, the sub-assemblies 10 at least provide a useful alternative to the seal in place method. As discussed above, in some cases gates through the thickness of the plates 12, 14 can be reduced or eliminated.

Although the sub-assembly 10 has been described above for use in a PEM fuel cell, a sub-assembly 10 as described above may also be used in another type of fuel cells, in a PEM or other type of electrolyser, or in electrolytic cells generally. The sub-assembly 10, and the method of making it, may also be modified in various ways within the scope of the invention, which is defined by the following claims.

The invention claimed is:

1. A sub-assembly for an electrochemical stack comprising,
   a) a bipolar plate having upper and lower faces and an edge between the upper and lower faces, the upper and lower faces both containing flow fields; and,
   b) sealing material bonded to the bipolar plate and extending from the upper face of the bipolar plate, around the edge of the bipolar plate, and onto the lower face of the plate,
      wherein the bipolar plate comprises an anode plate and a cathode plate bonded together by the sealing material, and a coolant flow field between the anode plate and the cathode plate;
      wherein the sealing material further extends between the anode plate and the cathode plate to form a seal around the coolant flow field; and
      wherein one or both of the anode and cathode plates have a peripheral step extending inwards from the edge in the inner face of the plate, a peripheral key extending inwards from the edge in the inner face of the plate, or a gate extending inwards from the edge along an inner face of the plate to a groove in the inner face of at least one of the anode and cathode plates, the step, key or gate and groove filled with sealing material.

2. The sub-assembly of claim 1 wherein the sealing material also forms a bead around the periphery of one or both of the flow fields.

3. The sub-assembly of claim 1 wherein the sealing material also forms one or more beads around one or more holes for reactant, combustion product, or coolant flow through the bipolar plate.

4. The sub-assembly of claim 1 having a step or key in the edge of the bipolar plate.

5. The sub-assembly of claim 1 wherein the sealing material is one contiguous mass.

6. An electrochemical stack having a plurality of sub-assemblies as described in claim 1.

7. The stack of claim 6 further comprising a membrane electrode assembly at least partially overlaps with the sealing material on the upper face of the lower sub-assembly and with the sealing material on a lower face of an upper sub-assembly.

8. The stack of claim 7 further comprising a gas diffusion layer located between the upper face of the lower sub-assembly and the membrane electrode assembly and within the sealing material on the upper face of the lower sub-assembly.

9. The stack of claim 8 further comprising a second gas diffusion layer located between the lower face of the upper sub-assembly and the membrane electrode assembly and within the sealing material on the lower face of the upper sub-assembly.

10. The sub-assembly of claim 1 wherein one or both of the anode and cathode plates have a peripheral step extending inwards from the edge along the inner face of at least one of the plates, the step filled with sealing material.

11. The sub-assembly of claim 1 wherein one or both of the anode and cathode plates have a peripheral key extending inwards from the edge along the inner face of at least one of the plates, the key filled with sealing material.

12. The sub-assembly of claim 1 wherein one or both of the anode and cathode plates have a gate extending inwards from the edge along an inner face of at least one of the plates to a groove in the inner face of at least one of the plates, the gate and groove filled with sealing material.

\* \* \* \* \*